US009371069B2

(12) United States Patent
Kim

(10) Patent No.: US 9,371,069 B2
(45) Date of Patent: Jun. 21, 2016

(54) APPARATUS AND METHOD FOR CONTROLLING ENGINE CLUTCH OF HYBRID ELECTRIC VEHICLE

(71) Applicant: Hyundai Motor Company, Seoul (KR)

(72) Inventor: Sangjoon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/551,040

(22) Filed: Nov. 23, 2014

(65) Prior Publication Data

US 2015/0344021 A1    Dec. 3, 2015

(30) Foreign Application Priority Data

May 27, 2014  (KR) .................. 10-2014-0063873

(51) Int. Cl.

| | |
|---|---|
| *B60W 10/00* | (2006.01) |
| *B60W 20/00* | (2016.01) |
| *B60W 10/08* | (2006.01) |
| *B60K 6/48* | (2007.10) |
| *B60W 10/02* | (2006.01) |
| *B60W 30/184* | (2012.01) |
| *B60W 10/06* | (2006.01) |
| *B60W 10/30* | (2006.01) |
| *B60W 30/18* | (2012.01) |

(52) U.S. Cl.
CPC ............... *B60W 20/108* (2013.01); *B60K 6/48* (2013.01); *B60W 10/02* (2013.01); *B60W 10/06* (2013.01); *B60W 10/08* (2013.01); *B60W 10/30* (2013.01); *B60W 20/40* (2013.01); *B60W 30/184* (2013.01); *B60W 30/18072* (2013.01); *B60K 2006/4825* (2013.01); *B60W 2510/0695* (2013.01); *B60W 2710/083* (2013.01); *Y10S 903/93* (2013.01)

(58) Field of Classification Search
CPC combination set(s) only.
See application file for complete search history.

(56) References Cited

U.S. PATENT DOCUMENTS

| 5,789,881 | A * | 8/1998 | Egami | B60K 6/485 180/65.245 |
|---|---|---|---|---|
| 5,833,570 | A * | 11/1998 | Tabata | B60K 6/365 477/3 |
| 6,672,415 | B1 * | 1/2004 | Tabata | B60K 6/365 180/65.25 |
| 8,894,541 | B2 * | 11/2014 | Gibson | B60K 6/48 477/5 |
| 2005/0044873 | A1 * | 3/2005 | Tamai | B60H 1/004 62/323.1 |
| 2006/0113129 | A1 * | 6/2006 | Tabata | B60K 6/365 180/65.25 |
| 2006/0266567 | A1 * | 11/2006 | Tamai | B60K 6/485 180/65.1 |
| 2008/0156550 | A1 * | 7/2008 | Wei | B60K 6/387 180/65.23 |

(Continued)

FOREIGN PATENT DOCUMENTS

| JP | 2012-240447 A | 12/2012 |
|---|---|---|
| JP | 2013-096518 A | 5/2013 |

(Continued)

*Primary Examiner* — Jonathan L Sample
(74) *Attorney, Agent, or Firm* — Mintz Levin Cohn Ferris Glovsky and Popeo, P.C.; Peter F. Corless

(57) ABSTRACT

An apparatus and a method for controlling an engine clutch of a hybrid electric vehicle control a torque of an input shaft of the engine clutch to 0 by using an integrated hybrid starter and generator (HSG) and releases the engine clutch. The method may include: determining whether a release of the engine clutch is required while the hybrid electric vehicle is operating with fuel cut off; calculating an engine friction torque; increasing an output torque of the HSG by an absolute value of the calculated engine friction torque; decreasing a motor torque corresponding to the output torque of the HSG; and releasing the engine clutch when the output torque of the HSG is equal to the engine friction torque.

5 Claims, 4 Drawing Sheets

(56) References Cited

U.S. PATENT DOCUMENTS

| | | | | |
|---|---|---|---|---|
| 2008/0302324 | A1* | 12/2008 | Aswani | B60K 6/485 123/65.23 |
| 2010/0204908 | A1* | 8/2010 | Nakai | B60W 10/06 701/112 |
| 2011/0118078 | A1* | 5/2011 | Kraska | B60K 6/48 477/5 |
| 2013/0226385 | A1* | 8/2013 | Ueno et al. | B60L 11/14 701/22 |
| 2013/0291830 | A1* | 11/2013 | Doering | F02D 41/023 123/350 |
| 2013/0296102 | A1* | 11/2013 | Banker | B60W 10/196 477/4 |
| 2013/0296124 | A1* | 11/2013 | Pietron | B60W 20/40 477/5 |
| 2013/0296132 | A1* | 11/2013 | Doering | B60K 6/48 477/86 |
| 2013/0297123 | A1* | 11/2013 | Gibson | B60W 20/1084 701/22 |
| 2013/0297161 | A1* | 11/2013 | Gibson | B60W 20/00 701/54 |
| 2014/0058597 | A1* | 2/2014 | Park | G06F 17/00 701/22 |
| 2014/0080660 | A1* | 3/2014 | Zhang | B60W 20/00 477/3 |
| 2014/0100729 | A1* | 4/2014 | Jung | F02D 41/042 701/22 |
| 2014/0371960 | A1* | 12/2014 | Lee | F04B 49/06 701/22 |
| 2015/0047607 | A1* | 2/2015 | Glugla | F02P 5/145 123/406.23 |
| 2015/0105215 | A1* | 4/2015 | Park | B60K 6/442 477/5 |

FOREIGN PATENT DOCUMENTS

| | | |
|---|---|---|
| KR | 10-2011-0044566 A | 4/2011 |
| KR | 10-2013-0124459 A | 11/2013 |
| KR | 10-2014-0048586 A | 4/2014 |

* cited by examiner

APPARATUS AND METHOD FOR CONTROLLING ENGINE CLUTCH OF HYBRID ELECTRIC VEHICLE

CROSS-REFERENCE TO RELATED APPLICATION

This application claims under 35 U.S.C. §119(a) priority to and the benefit of Korean Patent Application No. 10-2014-0063873 filed in the Korean Intellectual Property Office on May 27, 2014, the entire contents of which are incorporated herein by reference.

BACKGROUND (a) Field of the Invention

The present invention relates to an apparatus and a method for controlling an engine clutch of a hybrid electric vehicle, more particularly, to an apparatus and a method that controls torque of an input shaft of the engine clutch to 0 by using an integrated hybrid starter and generator (HSG), and releases the engine clutch.

(b) Description of the Related Art

Generally, a hybrid electric vehicle is driven by an engine which generates torque from fuel combustion and an electric motor which generates torque from an electric battery.

The hybrid electric vehicle may be driven in a driving mode such as an electric vehicle (EV) mode, which is a true electric vehicle mode only using power of the motor, a hybrid electric vehicle (HEV) mode which uses rotational force of the engine as main power and rotational force of the motor as auxiliary power, and a regenerative braking (RB) mode for collecting braking and inertial energy while braking or coasting of the vehicle through electricity generation of the motor to charge the battery.

Generally, the hybrid electric vehicle is driven by power of the engine and the motor at a high speed, and performs regenerative braking to generate power by operating the motor during deceleration.

As such, the hybrid electric vehicle uses both mechanical energy of the engine and electrical energy of the high voltage battery, and uses an optimal operation area of the engine and the motor and collects the energy to the motor during braking, and as a result, fuel efficiency can be improved and energy can be efficiently used.

As described above, the hybrid electric vehicle performs regenerative braking while the hybrid electric vehicle is operating (particularly coasting), however, the motor cannot be operated as a generator when battery charging is limited due to a high state of charge (SOC) of the battery.

Therefore, the hybrid electric vehicle couples the engine clutch instead of performing regenerative braking and cuts off fuel for using engine friction torque when battery charging is limited while the hybrid electric vehicle is operating.

At this time, when the hybrid electric vehicle releases the engine clutch for accelerating, slip of the engine clutch occurs because of a hydraulic pressure decrease and a shock occurs because of the engine friction torque.

Conventionally, the motor performs torque compensation by reflecting transmission torque of the engine clutch in order to prevent the shock. However, the transmission torque of the engine clutch cannot be calculated accurately, so the torque compensation by the motor cannot be controlled accurately.

The above information disclosed in this Background section is only for enhancement of understanding of the background of the invention and therefore it may contain information that does not form the prior art that is already known in this country to a person of ordinary skill in the art.

SUMMARY

The present invention provides an apparatus and a method for controlling an engine clutch of a hybrid electric vehicle having advantages of controlling torque of an input shaft of the engine clutch to 0 by using an integrated hybrid starter and generator (HSG) and releasing the engine clutch.

An exemplary embodiment of the present invention provides a method for controlling an engine clutch of a hybrid electric vehicle that may include: determining whether a release of the engine clutch is required while the hybrid electric vehicle is operating with fuel cut off; calculating an engine friction torque when the release of the engine clutch is required; increasing an output torque of an integrated hybrid starter and generator (HSG) by an absolute value of the calculated engine friction torque; decreasing a motor torque corresponding to the output torque of the HSG; and releasing the engine clutch when the output torque of the HSG is equal to the engine friction torque.

The increase of the output torque of the HSG by the absolute value of the calculated engine friction torque may be performed when the release of the engine clutch is required.

The method may further include decreasing the output torque of the HSG after releasing the engine clutch.

The determination whether a release of the engine clutch is required while the hybrid electric vehicle is operating with fuel cut off may be determined based on signals of an accelerator pedal sensor and a brake pedal sensor.

A sum of the motor torque and the output torque of the HSG may be controlled the same as a demand torque of a driver.

Another exemplary embodiment of the present invention provides an apparatus for controlling an engine clutch of a hybrid electric vehicle that may include: an engine clutch configured to selectively connect an engine and a motor generating power; an integrated hybrid starter and generator (HSG) configured to start the engine or generate power by an engine torque; an accelerator pedal position sensor (APS) configured to detect a position value of an accelerator pedal; a brake pedal position sensor (BPS) configured to detect a position value of a brake pedal; and a controller configured to control an output torque of the HSG so as to set a torque of an input shaft of the engine clutch to 0 based on signals of the APS and the BPS when a release of the engine clutch is required while the hybrid electric vehicle is operating with fuel cut off.

The controller may increase the output torque of the HSG by an absolute value of an engine friction torque when the release of the engine clutch is required.

The controller may decrease a motor torque corresponding to the output torque of the HSG.

The controller may control a sum of the motor torque and the output torque of the HSG to be same as a demand torque of a driver.

The controller may decrease the output torque of the HSG after releasing the engine clutch.

As described above, according to an exemplary embodiment of the present invention, when the hybrid electric vehicle releases the engine clutch while operating with fuel cut off, a shock which is generated by an engine friction torque can be prevented, and drivability of the hybrid electric vehicle can be improved.

In addition, a torque of an input shaft of the engine clutch is controlled to 0 without fuel injection, so fuel consumption may be improved and exhaust gas may be reduced.

DETAILED DESCRIPTION OF THE EMBODIMENTS

Figure 1:
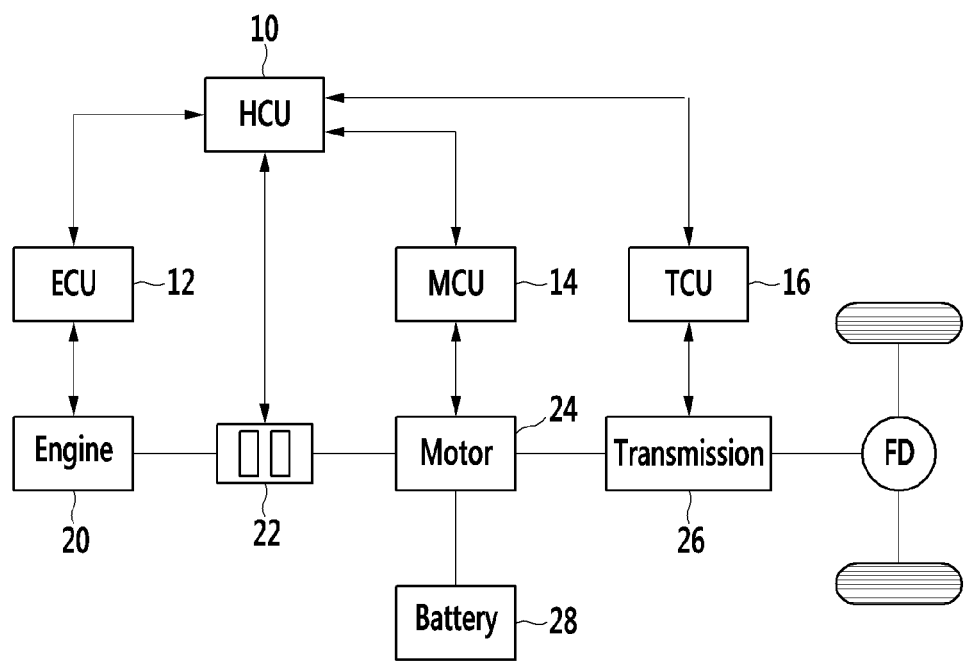
FIG. 1 is a schematic diagram of a hybrid system to which a method for controlling an engine clutch of a hybrid electric vehicle is applied according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Like reference numerals designate like elements throughout the specification.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present invention will hereinafter be described in detail with reference to the accompanying drawings.

FIG. 1 is a schematic diagram of a hybrid system to which a method for controlling an engine clutch of a hybrid electric vehicle is applied according to an exemplary embodiment of the present invention.

A method for controlling engine starting while shifting of a hybrid electric vehicle according to the exemplary embodiment of the present invention may not only be applied to the hybrid system as shown in FIG. 1, but may also be applied to all other hybrid systems.

As shown in FIG. 1, the hybrid system to which the method for controlling torque reduction of a hybrid electric vehicle is applied according to an exemplary embodiment of the present invention includes a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28.

The HCU 10 controls operation of other controllers which mutually exchange information in an overall operation of a hybrid electric vehicle, so the HCU 10 controls output torque of the engine 20 and the motor 24 by cooperating with the other controllers.

The ECU 12 controls an operation of the engine 20 according to conditions of the engine 20, such as a demand torque of a driver, a coolant temperature, and an engine torque.

The MCU 14 controls an operation of the motor 24 according to a demand torque of a driver, a driving mode of the hybrid electric vehicle, and an SOC condition of the battery 28.

The TCU 16 controls an operation of the transmission 26 such as speed ratios of the transmission 26 depending on output torque of the engine 20 and the motor 24, and an amount of regenerative braking.

The engine 20 outputs power, and thus operates as a power source when the engine 20 is turned on.

The engine clutch 22 is disposed between the engine 20 and the motor 24 to receive a control signal of the HCU 10, and selectively connects the engine 20 and the motor 24 according to a driving mode of the hybrid electric vehicle.

The motor 24 is operated by a 3-phase AC voltage applied from the battery 28 through an inverter to generate torque, and operates as a power generator and supplies regenerative energy to the battery 28 in a coast-down mode.

The transmission 26 supplies a sum of an output torque of the engine 20 and an output torque of the motor 24 determined by coupling and releasing of the engine clutch 22 as an input torque, and selects a shift gear according to a vehicle speed and a driving condition to output driving force to a driving wheel and maintain driving.

The battery 28 is composed of a plurality of unit cells, and stores a high voltage for supplying a voltage to the motor 24, for example, 400 V or 450 V DC.

The battery 28 supplies a voltage to the motor 24 for supporting power output from the engine 20 in an HEV mode or provides drive force in an EV mode, and is charged by regenerative braking energy.

The hybrid system as described above is obvious to a person of ordinary skill in the art, so a detailed explanation thereof will be omitted.

Figure 2:
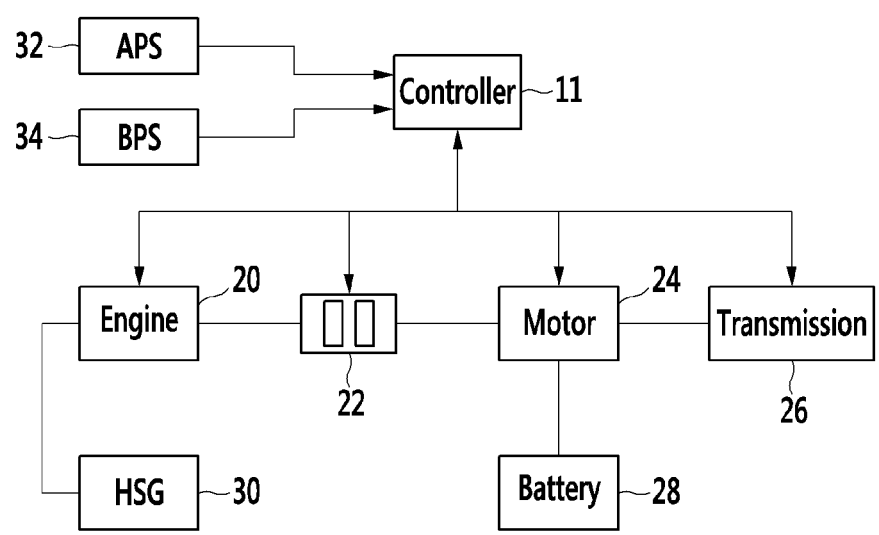
FIG. 2 is a schematic block diagram of an apparatus for controlling the engine clutch of the hybrid electric vehicle according to the exemplary embodiment of the present invention.

FIG. 2 is a schematic block diagram of an apparatus for controlling the engine clutch of the hybrid electric vehicle according to the exemplary embodiment of the present invention.

An apparatus for controlling the engine clutch of the hybrid electric vehicle according to the exemplary embodiment of the present invention includes an engine 20, an engine clutch 22, a motor 24, an integrated hybrid starter-generator (HSG) 30, an accelerator pedal positon sensor (APS) 32, a brake pedal positon sensor (BPS) 34 and a controller 11.

Some steps/processes in the method for controlling the engine clutch of the hybrid electric vehicle according to the exemplary embodiment of the present invention to be described below may be performed by the ECU 12, and some other steps/processes may be performed by the HCU 10. Accordingly, for convenience of description, as used herein, one or more controllers provided in the hybrid electric vehicle such as the ECU 12 and the HCU 10 are referred to as the controller 11.

The hybrid electric vehicle to which the exemplary embodiment of the present invention is applied includes at least one engine 20 and at least one motor 24. In addition, the hybrid electric vehicle provides a driving mode in which the engine 20 and the motor 24 separately or simultaneously operate as a power source. For this purpose, the engine clutch is disposed between the engine 20 and the motor 24 to selectively connect the engine 20 and the motor 24.

The HSG 30 starts the engine 20 by operating as a starter in response to a control signal from the controller 11, and generates power by operating as a generator and supplies the generated power as a charge voltage to the battery 28.

The accelerator pedal position sensor 32 continuously detects a position value of an accelerator pedal and transmits a monitoring signal to the controller 11. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake pipe may be used instead of the accelerator pedal position sensor 32. Therefore, as used herein, the accelerator pedal position sensor 32 preferably includes the throttle valve position sensor, and the position value of the accelerator pedal should be understood to be an opening value of the throttle valve.

The brake pedal position sensor 34 continuously detects a position value of a brake pedal and transmits a monitoring signal to the controller 11. The position value of the brake pedal may be 100% when the brake pedal is pressed fully, and the position value of the brake pedal may be 0% when the brake pedal is not pressed at all.

The controller 11 may determine whether the hybrid electric vehicle coasts with fuel cut off while coupling the engine clutch 22 based on signals input from the accelerator pedal position sensor 32 and the brake pedal position sensor 34.

For example, the controller 11 may determine that the hybrid electric vehicle coasts with fuel cut off when the position value of the accelerator pedal position sensor 32 and the position value of the brake pedal position sensor 34 are both 0%.

In addition, the controller 11 may control an output torque of the HSG 30 so as to set a torque of an input shaft of the engine clutch to 0 when a release of the engine clutch 22 is required while the hybrid electric vehicle is operating with fuel cut off.

In particular, the controller 11 may increase the output torque of the HSG 30 by an absolute value of an engine friction torque when the release of the engine clutch 22 is required, and may decrease a motor torque corresponding to the output torque of the HSG 30.

To this end, the controller 11 may be implemented as at least one processor that is operated by a predetermined program, and the predetermined program may be programmed in order to perform each step of the method for controlling the engine clutch of the hybrid electric vehicle according to the exemplary embodiment of the present invention.

Hereinafter, the method for controlling the engine clutch of the hybrid electric vehicle according to the exemplary embodiment of the present invention will be described in detail with reference to FIG. 3 and FIG. 4.

Figure 3:
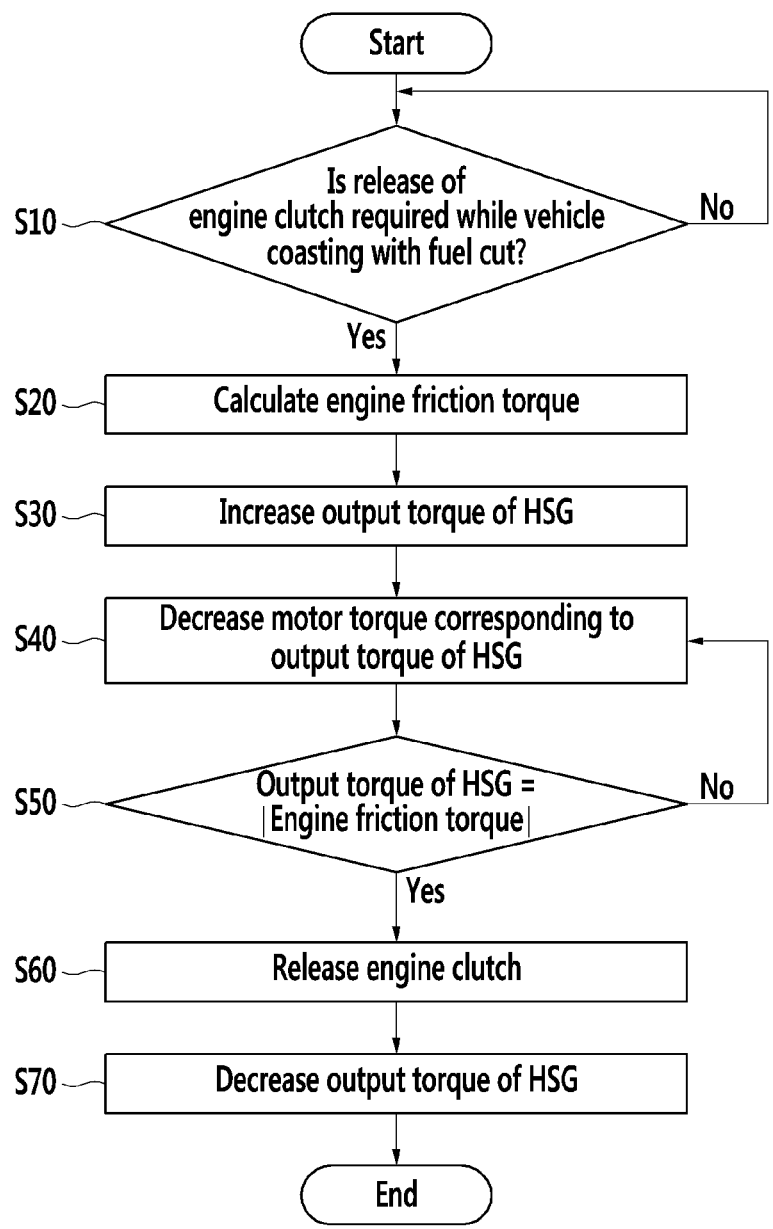
FIG. 3 is a flowchart showing a method for controlling the engine clutch of the hybrid electric vehicle according to the exemplary embodiment of the present invention.

FIG. 3 is a flowchart showing the method for controlling the engine clutch of the hybrid electric vehicle according to the exemplary embodiment of the present invention.

As shown in FIG. 3, the method for controlling the engine clutch of the hybrid electric vehicle according to the exemplary embodiment of the present invention starts with the controller 11 determining whether a release of the engine clutch 22 is required while the hybrid electric vehicle is operating with fuel cut off at step S10.

As described above, the controller 11 determines whether the hybrid electric vehicle coasts with fuel cut off based on signals input from the accelerator pedal position sensor 32 and the brake pedal position sensor 34. For example, the controller 11 may determine that the release of the engine clutch 22 is required when the hybrid electric vehicle should accelerate when entering an uphill slope.

If the release of the engine clutch 22 is required while the hybrid electric vehicle is operating with fuel cut odd at the step S10, the controller 11 calculates an engine friction torque at step S20.

The hybrid electric vehicle couples the engine clutch 22 and transmits power to a drive shaft by using the engine friction torque, so the engine friction torque may be a torque of an input shaft of the engine clutch 22.

After that, the controller 11 increases an output torque of the HSG 30 for controlling the torque of the input shaft of the engine clutch 22 to 0 at step S30. That is, the controller 11 increases the torque of the input shaft of the engine clutch 22 by an absolute value of the engine friction torque in order to offset the engine friction torque.

Simultaneously, the controller 11 decreases a motor torque to satisfy a demand torque of a driver at step S40.

In particular, the controller 11 may output a negative torque from the motor 24 corresponding to the output torque of the HSG 30. Thus, a sum of the motor torque and the output torque of the HSG 30 may be controlled to the same value as the demand torque of the driver.

After that, the controller 11 determines whether the output torque of the HSG 30 is increased by the absolute value of the engine friction torque at step S50. When the output torque of the HSG 30 is increased by the absolute value of the engine friction torque, the controller 11 releases the engine clutch 22 at step S60.

When the engine clutch 22 is released at the step S60, the controller 11 decreases the output torque of the HSG 30 at step S70, and the method for controlling the engine clutch of the hybrid electric vehicle according to the exemplary embodiment of the present invention is completed.

Figure 4:
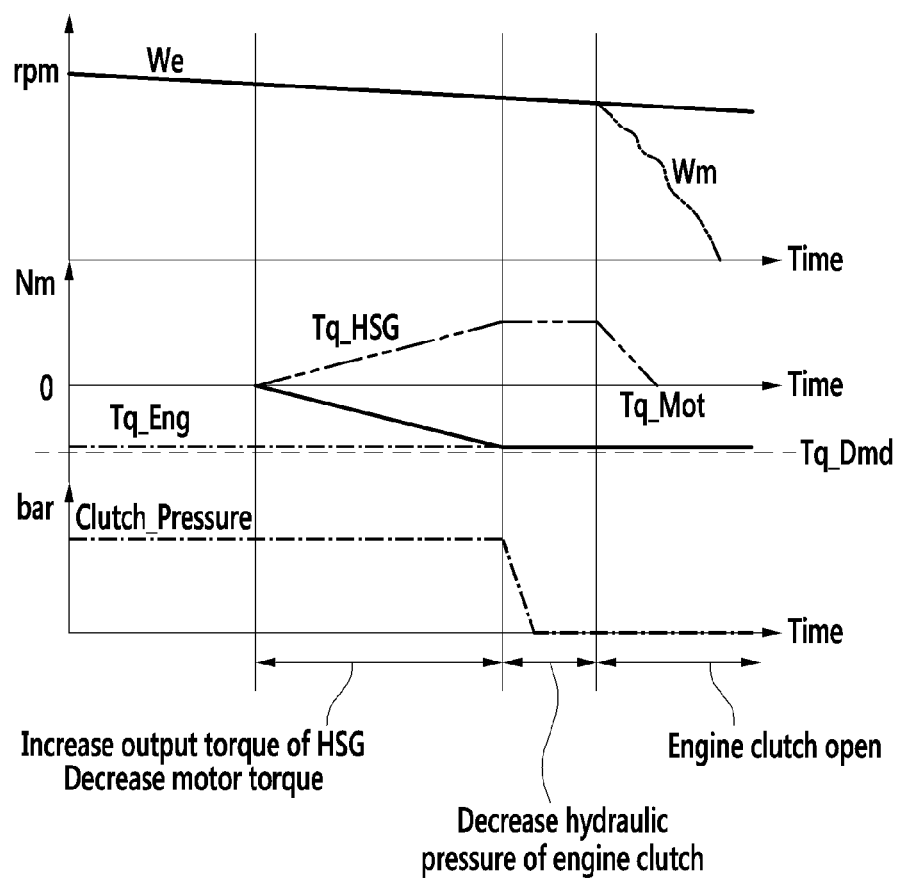
FIG. 4 is a graph describing an operation principle of a method for controlling the engine clutch of the hybrid electric vehicle according to the exemplary embodiment of the present invention.

FIG. 4 is a graph describing an operation principle of the method for controlling the engine clutch of the hybrid electric vehicle according to the exemplary embodiment of the present invention.

As shown in FIG. 4, the controller 11 gradually increases the output torque of the HSG and gradually decreases the motor torque in a second region depending on time. At this time, the sum of the motor torque and the output torque of the HSG 30 may be controlled to be the same value as the demand torque of the driver.

Then, the engine clutch 22 is released by decreasing a hydraulic pressure of the engine clutch in a third region where the output torque of the HSG 30 is the same as the absolute value of the engine friction torque. Herein, the controller 11 may continuously output the output torque of the HSG 30 which is the same as the absolute value of the engine friction torque so as to keep the torque of the input shaft of the engine clutch at 0 until the engine clutch 22 is completely released.

The controller 11 gradually decreases the output torque of the HSG 30 to 0 in a fourth region where the engine clutch is released completely.

As described above, according to the exemplary embodiment of the present invention, when the hybrid electric vehicle releases the engine clutch while operating with fuel cut off, a shock which is generated by an engine friction torque can be prevented, and drivability of the hybrid electric vehicle can be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for controlling an engine clutch of a hybrid electric vehicle having a serial arrangement of an integrated hybrid starter and generator (HSG), an engine, the engine clutch, a motor, and a transmission with respect to torque transmission, the engine clutch being configured to selectively connect the engine and the motor, the method comprising:
    determining whether a release of the engine clutch is required while the hybrid electric vehicle is operating with fuel cut off;
    calculating an engine friction torque when the release of the engine clutch is required;
    increasing an output torque of the HSG by an absolute value of the calculated engine friction torque, when the release of the engine clutch is required;
    decreasing a motor torque corresponding to the output torque of the HSG at the same time with the increasing of the output torque of the HSG, a sum of the motor torque and the output torque of the HSG being controlled to be the same as the demand torque of a driver, so that a delivery of the demand torque is maintained to the transmission during the decreasing of the motor torque and the increasing of the output torque of the HSG; and
    releasing the engine clutch when the output torque of the HSG is equal to the engine friction torque.

2. The method of claim 1, further comprising decreasing the output torque of the HSG after releasing the engine clutch.

3. The method of claim 1, wherein the step of determining whether the release of the engine clutch is required while the hybrid electric vehicle is operating with fuel cut off is determined based on signals of an accelerator pedal sensor and a brake pedal sensor.

4. An apparatus for controlling an engine clutch of a hybrid electric vehicle, comprising:
    an engine clutch configured to selectively connect an engine and a motor generating power, the motor transmitting a motor torque to a transmission;
    an integrated hybrid starter and generator (HSG) configured to start the engine or generate power by an engine torque, the HSG being separately arranged from the motor;
    an accelerator pedal position sensor (APS) configured to detect a position value of an accelerator pedal;
    a brake pedal position sensor (BPS) configured to detect a position value of a brake pedal; and
    a controller configured to control an output torque of the HSG so as to set a torque of an input shaft of the engine clutch to 0 based on signals of the APS and the BPS when a release of the engine clutch is required while the hybrid electric vehicle is operating with fuel cut off,
    wherein the hybrid electric vehicle has a serial arrangement of the HSG, the engine, the engine clutch, the motor, and the transmission with respect to torque transmission,
    wherein the controller is configured to, when the release of the engine clutch is required, increase the output torque of the HSG by an absolute value of an engine friction torque and decrease a motor torque corresponding to the output torque of the HSG at the same time with the increasing of the output torque of the HSG, a sum of the motor torque and the output torque of the HSG being controlled to be the same as the demand torque of a driver, so that a delivery of the demand torque is maintained to the transmission during the decreasing of the motor torque and the increasing of the output torque of the HSG.

5. The apparatus of claim 4, wherein the controller decreases the output torque of the HSG after releasing the engine clutch.

* * * * *